March 19, 1957  M. J. MAINA  2,785,776
HYDRAULIC BRAKE ASSEMBLY FOR ROAD VEHICLES
Filed Jan. 8, 1953  2 Sheets-Sheet 1
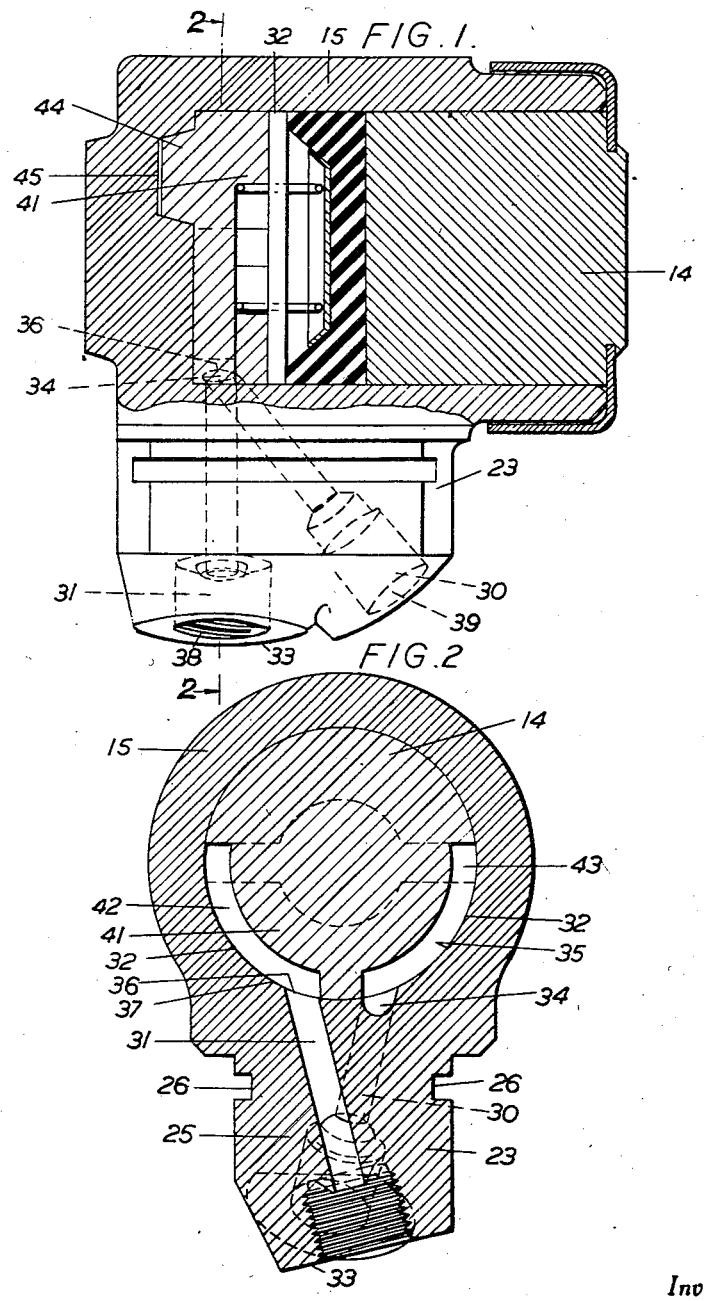
Inventor
Mario Joseph Maina
By
Willets, Helwig & Baillie
Attorneys March 19, 1957   M. J. MAINA   2,785,776
HYDRAULIC BRAKE ASSEMBLY FOR ROAD VEHICLES
Filed Jan. 8, 1953   2 Sheets-Sheet 2

Inventor
*Mario Joseph Maina*
By
*Willits, Helmig & Baillio*
Attorneys

United States Patent Office 2,785,776
Patented Mar. 19, 1957

2,785,776

HYDRAULIC BRAKE ASSEMBLY FOR ROAD VEHICLES

Mario Joseph Maina, Luton, England, assignor to General Motors Corporation, Detroit, Mich., a corporation of Delaware Application January 8, 1953, Serial No. 330,303

Claims priority, application Great Britain January 17, 1952

4 Claims. (Cl. 188—152)

This invention relates to hydraulic brake assemblies for road vehicles.

Such brake assemblies usually have an actuator comprising a piston or pistons in a cylinder which is fed with fluid under pressure to operate the brake. The cylinder is usually mounted on the backing plate or the like of the brake assembly.

With the usual arrangement of cylinder the channels for the air bleed and liquid supply are vertically above one another with a proportionately thick mounting lug and wide slot.

The object of the invention is to provide a brake assembly in which the channels for air bleed from, and liquid supply to, the cylinder are so arranged that the lug can be made substantially thinner than heretofore; and consequently the mounting slot in the backing plate of the brake assembly can be narrower than heretofore.

This object is achieved by an hydraulic brake assembly comprising an actuator cylinder having an elongated lug rigid therewith which projects through and is thereby attached to the brake backing plate and contains air bleed and liquid supply channels leading to the interior of the cylinder.

Optionally, the lug can project through and be slidable in a slot elongated at right angles to a radius of the backing plate; and the air bleed and liquid supply channels can be arranged so that their inner ends are respectively at the upper and lower parts of the inner surface of the cylinder, and their outer ends lie on a line substantially at right angles to said radius.

The scope of the invention is defined by the appended claims and how it can be carried into effect is hereinafter particularly described with reference to the accompanying drawings in which:

Fig. 1 is an enlarged and partly sectioned plan view of a brake cylinder assembly embodying the present invention.

Fig. 2 is a diagrammatic section on line 2—2 of Fig. 1.

Figure 3:
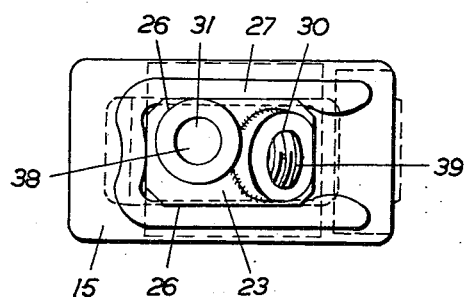
Figs. 3 and 4 are respectively an elevation and a plan view of the brake cylinder assembly.
Figure 4:
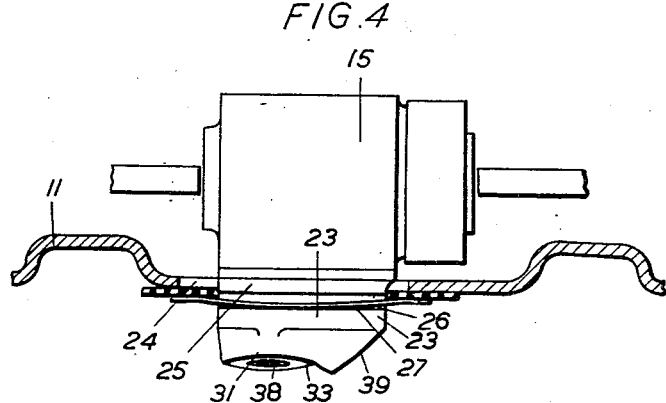

The brake assembly shown in the drawings comprises a backing plate 11 shown partially in Fig. 4 on which may be mounted two brake shoes (not shown) in a usual manner operable by an actuator comprising a single piston 14 in a cylinder 15 shown in Figs. 1 and 2. A portion at one end of one brake shoe may abut against the rear of the cylinder 15, a portion at one end of the other brake shoe may abut against the piston 14, whilst the adjacent ends opposite the aforementioned portions of the shoes may be articulated in known manner.

On the cylinder 15 as shown in the drawings, there is a lug 23 including a part 25 which projects laterally through and is slidable in an elongated slot 24 in the backing plate 11; the slot 24 having its greater dimension perpendicular to a radius of the backing plate 11. The upper and lower surface of the part 25 of the lug 23 which projects through the backing plate 11 are grooved at 26 for a hairpin shaped retainer spring 27 which is slid into place after the lug 23 is in position.

In the lug 23 (Figs. 1 and 2) are two channels 30, 31 connecting the inner wall 32 of the cylinder 15 to the outer end face 33, of the lug 23, which is parallel to the face of the backing plate 11. One of these channels constitutes the air bleed channel 30 and has its inner end 34 terminating at the upper part 35 of the end of the cylinder 15, and the other constitutes the liquid supply channel 31 and has its inner end 36 terminating at the lower part 37 of the end of the cylinder 15. The line joining the centers of the outer ends 38, 39 of the two channels 30, 31 respectively is substantially perpendicular to a radius of the backing plate 11, i. e. it is on a horizontal line in the manual brake assembly.

The cylinder 15 contains a cylindrical block 41 (Figs. 1 and 2) having separate arcuate grooves 42, 43 and at one end a dowel 44 which registers with a dowel hole 45 in the end of the cylinder 15 and thereby locates the grooves 42, 43 in the block 41 respectively relatively to the inner ends 34, 36 of the channels 30, 31 respectively in the lug 23. The grooves 42, 43 communicate respectively with the upper and lower parts of the cylinder 15.

The assembly has the advantage that a single piston and cylinder arrangement can be used such that any air in the system can be easily lead off through the bleed channel in the usual way.

With a brake assembly of the dimensions usually employed on a passenger vehicle but embodying the invention the lug 23 which projects through the braking plate 11 is only half an inch thick and the slot 24 can be correspondingly narrow.

The specific arrangement of the bleed passage 34 and the liquid inlet passage 31 is such that both passages are disposed within the mounting lug 25 in a manner to permit the mounting lug to be of a minimum size. It will be appreciated that in the manufacture of automobiles there is a constant effort to reduce the cost of individual components to an irreducible minimum, the battle being such that even a reduction of cost of one-tenth of a cent is quickly taken advantage of because of the numerous components that are used on automobiles with a gross net reduction of a substantial amount that can be gained by minute reductions of the cost of the individual components. Therefore, the quantity of material that is used on any individual element is closely scrutinized so that a minimum amount of material will be used and the material used is constructed so that a plurality of functions can be performed by any single item of material used.

Thus, the lug 25 that contains the bleed passage 34 and the fluid inlet passage 31 is also utilized as the mounting lug for the actuator cylinder 15. However to hold the cost of the cylinder element down to a bare minimum it is desirable to use as little material as possible. Thus, the passages 31 and 34 are angled relative one to the other with their inner ends placed adjacent circumferentially of the inner surface of the cylinder while their outer ends are placed substantially on a line normal to a radius line of the cylinder or normal to a radius line of the backing plate.

This position of the passages 31 and 34 brings them into the cylinder at substantially the same point. It is desirable however to have the bleed passage taken from the highest point in the cylinder with the fluid inlet passage being positioned as remote as possible from the bleed passage. This is for the reason that when the fluid inlet is remote from the bleed passage, complete expelling of air from the cylinder can be accomplished during a bleeding operation since the fluid entering through the inlet will wash all of the air from a cylinder through a bleed passage.

Hence, in this invention the cylindrical block 41 is disposed circumferentially aligned with the inner ends of the channels 31 and 34 so that the peripherally placed passages 42 and 43 in the block 41 will have their adjacent ends connected respectively with the passages 31 and 34 and their outer ends placed at diametrically opposite sides of the cylinder, that is at the top and bottom thereof.

Arrangement of the passages of this invention therefore effects the greatest economy in utilization of materials in manufacture of the cylinder and its mounting lug as well as providing the most satisfactory arrangement of position of the liquid inlet relative to the bleed passage to secure a complete washing of air from the cylinder during a bleeding operation.

I claim:

1. An actuator cylinder for a hydraulic brake assembly, comprising, a cylinder body having a cylinder bore, a mounting lug integral with said cylinder body, said lug projecting generally radially from said body, the cross section of the lug being elongated in the direction of the longitudinal axis of the cylinder, said lug having air bleed and liquid supply channels extending therethrough leading from the outer end face of said lug to the interior of the cylinder, the channels being positioned in said lug relative to one another and generally radial of the cylinder with their inner ends closely adjacent one another in a plane normal to the longitudinal axis of the cylinder and with their outer ends substantially on a line normal to a radius line of the cylinder through the lug and substantially on a median line through said lug that extends in the direction of elongation of said lug and substantially parallel with the longitudinal axis of the cylinder.

2. An actuator cylinder according to claim 1 in which the cylinder contains a cylindrical block peripherally engaging the peripheral wall of the bore and circumferentially aligned with the inner ends of said channels and having independent passages therein positioned with their one ends adjacent one another and respectively connected with said channels and their other ends at substantially diametrically opposite sides of the cylinder, said block having a dowel projecting therefrom in an axial direction and disposed in registration with a dowel hole in one end of the cylinder to maintain the said position of passages relative to said channels.

3. An actuator cylinder for a hydraulic brake assembly, comprising, a cylinder body having a cylinder bore, a mounting lug integral with said cylinder body, said lug projecting generally radially from said body, the cross section of the lug being elongated in the direction of the longitudinal axis of the cylinder and having an external groove on opposite surfaces extending in the elongated direction, each groove on each surface being located in a solid part of said lug for use in mounting the cylinder through an opening of a brake backing plate, said lug having air bleed and liquid supply channels extending therethrough leading from the outer end face of said lug to the interior of the cylinder with their inner ends closely adjacent one another in a plane normal to the longitudinal axis of the cylinder and with their outer ends substantially on a line normal to a radius line of the cylinder through the lug and substantially on a median line through said lug that extends in the direction of elongation of said lug and substantially parallel with the longitudinal axis of the cylinder so that maximum strength with minimum dimension of the said part of said lug can be used in mounting the cylinder and lug to the brake backing plate.

4. The actuator cylinder of claim 3 wherein each groove on each surface of said lug is located on a side of the brake backing plate remote from the cylinder body for receiving a substantially U-shaped hair-pin-type retaining means for supporting both the cylinder and channel-providing lug therewith.

References Cited in the file of this patent

UNITED STATES PATENTS

| | | |
|---|---|---|
| 2,057,724 | La Brie | Oct. 20, 1936 |
| 2,069,831 | Hirschman et al. | Feb. 9, 1937 |
| 2,138,205 | Rasmussen et al. | Nov. 29, 1938 |
| 2,385,540 | Rasmussen | Sept. 25, 1945 |
| 2,666,504 | Berno | Jan. 19, 1954 |